(12) United States Patent
Tsuruoka et al.

(10) Patent No.: US 12,455,429 B2
(45) Date of Patent: Oct. 28, 2025

(54) LENS UNIT

(71) Applicants: NIDEC SANKYO CORPORATION, Nagano (JP); Panasonic Corporation, Osaka (JP)

(72) Inventors: Yasuo Tsuruoka, Nagano (JP); Akinori Yamamoto, Nagano (JP); Toshio Shirotori, Nagano (JP); Katsumi Umeda, Osaka (JP); Masanori Tanikawa, Osaka (JP); Shinya Okada, Osaka (JP)

(73) Assignees: NIDEC SANKYO CORPORATION, Nagano (JP); PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 1141 days.

(21) Appl. No.: 17/375,186

(22) Filed: Jul. 14, 2021

(65) Prior Publication Data

US 2022/0019050 A1 Jan. 20, 2022

(30) Foreign Application Priority Data

Jul. 15, 2020 (JP) .................................. 2020-121286

(51) Int. Cl.
*G02B 7/02* (2021.01)
(52) U.S. Cl.
CPC ............. *G02B 7/028* (2013.01); *G02B 7/021* (2013.01)

(58) Field of Classification Search
CPC .......... G02B 7/02; G02B 7/021; G02B 7/022; G02B 7/023; G02B 7/025; G02B 7/026; G02B 7/027; G02B 7/028; G02B 27/0006; G02B 27/0018; G02B 27/646; G03B 17/12; H04N 23/55; H04N 23/52
See application file for complete search history.

(56) References Cited

U.S. PATENT DOCUMENTS

| 2021/0294066 | A1* | 9/2021 | Hirata | .................... G02B 7/021 |
| 2023/0244128 | A1* | 8/2023 | Van Den Brink | ..... G03B 17/02 359/820 |

FOREIGN PATENT DOCUMENTS

JP 2019-168509 A 10/2019

\* cited by examiner

*Primary Examiner* — Ephrem Z Mebrahtu

(57) ABSTRACT

A lens unit 1 includes a plurality of lenses aligned in a row along an optical axis L and a lens holder 2. A first lens L1 located the closest to an object-side La includes an object-side lens surface 11, an image-side lens surface 12, and an image-side flange surface 13. A first housing portion 4 accommodating the first lens L1 in the lens holder 2 includes a regulation portion 42 regulating a position of the first lens L1 in the optical axis L direction. The regulation portion 42 includes a lens seating surface 40 in contact with the first lens L1. The image-side flange surface 13 of the first lens L1 includes an outer peripheral region 13A in contact with the lens seating surface 40 of the regulation portion 42 and an inner peripheral region 13B in which a flexible printed circuit board 8 is disposed.

17 Claims, 16 Drawing Sheets

LENS UNIT

CROSS-REFERENCE TO RELATED APPLICATIONS

This application claims the benefits of Japanese Patent Application No. 2020-121286 filed Jul. 15, 2020. The content of Japanese Patent Application No. 2020-121286 is hereby incorporated by reference in its entirety.

BACKGROUND

Field of the Invention

At least an embodiment of the present invention relates to a lens unit in which a plurality of lenses are disposed on an optical axis.

Description of the Related Documents

Japanese Unexamined Patent Application Publication No. 2019-168509 discloses a lens unit used in an optical device. The lens unit of Japanese Unexamined Patent Application Publication No. 2019-168509 includes a plurality of lenses disposed on the optical axis and a lens holder holding the plurality of lenses. The lens holder is a molded product consisting of a lens barrel (lens barrel) and a case (front case) that covers the lens barrel. A gap between a first lens, which is located on the closest to a subject side among the plurality of lenses, and the lens barrel is sealed by an O-ring.

In the lens unit of Japanese Unexamined Patent Application Publication No. 2019-168509, a heater is disposed inside the lens unit in order to suppress condensation inside the lens unit when the lens unit is used outdoors. The heater is an electric heating wire disposed on the surface of an annular flexible printed circuit board (caliber plate) having thermal conductivity. The temperature around the lens is raised by energizing the electric heating wire to generate heat.

In Japanese Unexamined Patent Application Publication No. 2019-168509, a flexible printed circuit board including a heater is in contact with an annular flat surface provided on an outer peripheral portion of the first lens. The flat surface of the first lens has an inner peripheral portion facing an outer peripheral portion of a second lens and the outer peripheral portion facing the lens barrel (a bottom surface of a housing that accommodates the first lens). In the structure as above in which the flexible printed circuit board is interposed between the first lens and the lens barrel and between the first lens and the second lens, positional accuracy of the first lens in the optical axis direction is affected by thickness tolerance of the flexible printed circuit board. In addition, since the flexible printed circuit board is crushed when pressed, thickness variation increases by an amount of the crush. Therefore, there are problems that the positional accuracy of the first lens in the optical axis direction is lowered, and optical performance of the lens unit is varied.

In view of the above problems, an object of at least an embodiment of the present invention is to suppress lowering of the positional accuracy in the optical axis direction of the lens caused by a heater being disposed inside the lens unit.

SUMMARY

In order to solve the above problem, the lens unit of at least an embodiment of the present invention includes a first lens disposed the closest to an object side, a second lens disposed on an image side with respect to the first lens, a lens holder having a first housing portion that accommodates the first lens and a second housing portion that accommodates the second lens, and a flexible printed circuit board including a heater, in which the first lens includes an object-side lens surface, an image-side lens surface, and an image-side flange surface that surrounds the image-side lens surface, the first housing portion includes a regulation portion that regulates the position of the first lens in the optical axis direction, and the image-side flange surface includes an inner peripheral region in which the flexible printed circuit board is disposed, and an outer peripheral region with which the regulation portion is brought into contact.

According to at least an embodiment of the present invention, since the flexible printed circuit board including the heater on the image-side flange surface of the first lens is disposed, the temperature around the first lens can be raised. Therefore, condensation inside the lens unit which causes lowering of the optical performance can be suppressed. Moreover, in at least an embodiment of the present invention, the regulation portion is provided on the lens holder, and the outer peripheral region of the image-side flange surface is brought into contact with the regulation portion. As described above, by using a structure in which the first lens is brought into direct contact with the lens holder, influence of variations in the thickness tolerance of the flexible printed circuit board disposed on the image-side flange surface on the positional accuracy of the first lens can be avoided. Therefore, lowering of the positional accuracy of the first lens caused by the placement of the flexible printed circuit board on the image-side flange surface can be avoided.

In at least an embodiment of the present invention, the flexible printed circuit board includes a flat surface portion along the image-side flange surface and an extension portion extending outward in a radial direction, the flat surface portion includes a connecting portion connected to the extension portion, the first housing portion includes a counterbore portion recessed outward in the radial direction from an inner peripheral edge of the regulation portion, and the connecting portion is preferably disposed in the counterbore portion. In this way, interference of the connecting portion connecting the extension portion for withdrawing the flexible printed circuit board to an outside and the flat surface portion for disposing the heater with the regulation portion can be avoided. Therefore, the lowering of the positional accuracy of the first lens can be avoided, and variations in the optical performance of the lens unit can be suppressed.

In at least an embodiment of the present invention, it is preferable that the lens holder includes a through hole that is opened in an inner surface of the counterbore portion, and the extension portion is inserted into the through hole. In this way, interference of the extension portion provided for withdrawing the flexible printed circuit board to the outside with the regulation portion can be avoided. In addition, the extension portion can be bent and held inside the through hole when it is passed through the through hole. Alternatively, the extension portion can be fixed to the through hole by an adhesive or the like. Therefore, even if the extension portion withdrawn to the outside is pulled, the stress is unlikely transmitted to the connecting portion and the flat surface portion.

In at least an embodiment of the present invention, it is preferable that a transparent conductive film disposed on the image-side lens surface is provided, the flexible printed circuit board includes a protruding portion protruding outward in the radial direction from the flat surface portion, the protruding portion is disposed on the counterbore portion, and an electrode electrically connected to the transparent conductive film is disposed on the protruding portion. In this way, the first lens can be heated directly by energizing the transparent conductive film so as to generate heat. Therefore, generation of condensation can be suppressed. In addition, since a flexible printed circuit board can be used to feed power to the transparent conductive film, complexity of wiring inside the lens unit can be avoided. Further, since the electrodes for connection to the transparent conductive film are disposed on the protruding portion accommodated in the counterbore portion, sandwiching of the electrodes between the lens holder and the first lens can be avoided. This can reduce a risk of nonconformity such as short-circuiting due to the crush of patterns of conductors configuring the electrodes.

In at least an embodiment of the present invention, it is preferable that a blackened film formed on the image-side flange surface is provided, and the transparent conductive film includes arm portions stacked on top of the blackened film and connected to the electrode via the arm portions. In this way, since the flexible printed circuit board overlaps with the blackened film, lowering of the optical performance caused by the placement of the flexible printed circuit board can be suppressed. In addition, ghosting caused by light transmitted through the image-side flange surface can be suppressed by the blackened film. Further, when irregularities (shibo) are formed on the image-side flange surface for diffusing the light, the irregularities (shibo) are filled and smoothed by the blackened film. Therefore, the arm portions of the transparent conductive film can be easily formed on the image-side flange surface. Further, an extraction electrode that is connected to the electrode on the flexible printed circuit board can be easily formed on the image-side flange surface.

In at least an embodiment of the present invention, such a configuration can be employed that a metal thin film disposed on the image-side flange surface is provided, the metal thin film is disposed on a part of the image-side flange surface in a circumferential direction, the flexible printed circuit board includes a protruding portion protruding outward in the radial direction from the flat surface portion, the protruding portion is disposed on the counterbore portion, and a tip end portion in a circumferential direction of the metal thin film is connected to an electrode disposed on the protruding portion. In this way, the image-side flange surface of the first lens can be heated directly by the metal thin film. In addition, compared with the case where a conductive film is formed on the image-side lens surface, influence of ghosting or the like on the optical performance can be reduced.

In this case, it is preferable that a blackened film formed on the image-side flange surface is provided, the metal thin film is laminated on the blackened film, a protective film is laminated on the metal thin film, the metal thin film is covered by the protective film over the entire range except for the tip end portion, the flat surface portion is annular, and the flat surface portion is disposed on the protective film. In this way, since the flexible printed circuit board overlaps with the blackened film, lowering of the optical performance caused by the placement of the flexible printed circuit board can be suppressed. In addition, since ghosting caused by the light transmitted through the image-side flange surface can be suppressed by the blackened film, the lowering of the optical performance caused by ghosting can be suppressed. Further, since the protective film is laminated on top of the metal thin film, the metal thin film can be protected. In particular, in a high-temperature and high-humidity state, there is a concern that the metal thin film is oxidized and cracked, resulting in a change in a resistance value, but the occurrence of cracks can be suppressed by providing the protective film. Therefore, the change in the resistance value can be suppressed, and the change in a heat generation amount can be suppressed. Further, when the flexible printed circuit board is disposed on the first lens, the protective film can be used as a fixing surface for fixing the flat surface portion.

In at least an embodiment of the present invention, the regulation portion includes a plurality of lens seating surfaces that are brought into contact with the image-side flange surface, and two of the lens seating surfaces are preferably disposed at positions adjacent to each other on one side in the circumferential direction with respect to the counterbore portion and at positions adjacent to each other on the other side in the circumferential direction with respect to the counterbore portion. In this way, inclination of the first lens toward the side of the counterbore portion can be suppressed. Therefore, the lowering of the optical performance of the lens unit can be suppressed.

In at least an embodiment of the present invention, the regulation portion preferably includes an outer edge portion extending in the circumferential direction on an outer peripheral side of the counterbore portion. In this way, a sealing material such as an O-ring can be supported by the outer edge portion. Therefore, lowering of the sealing performance caused by provision of the counterbore portion can be avoided.

In at least an embodiment of the present invention, it is preferable that the regulation portion is annular and faces the outer peripheral edge of the first lens over the entire circumference. In this way, the sealing material such as the O-ring, which is disposed between the outer peripheral edge of the first lens and the lens holder, can be supported over the entire circumference. Therefore, there is little risk of lowering of the sealing performance. In addition, since the lens seating surface can be disposed uniformly in the circumferential direction, there is little risk of inclination of the first lens.

According to at least an embodiment of the present invention, since the flexible printed circuit board including the heater is disposed on the image-side flange surface of the first lens, the temperature around the first lens can be raised. Therefore, condensation inside the lens unit which causes lowering of the optical performance can be suppressed. Moreover, in at least an embodiment of the present invention, the regulation portion is provided on the lens holder, and the outer peripheral region of the image-side flange surface is brought into contact with the regulation portion. As described above, by using a structure in which the first lens is brought into direct contact with the lens holder, influence of variations in the thickness tolerance of the flexible printed circuit board disposed on the image-side flange surface on the positional accuracy of the first lens can be avoided. Therefore, lowering of the positional accuracy of the first lens caused by the placement of the flexible printed circuit board on the image-side flange surface can be avoided, and variations in the optical performance of the lens unit can be suppressed.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

Figure 1:
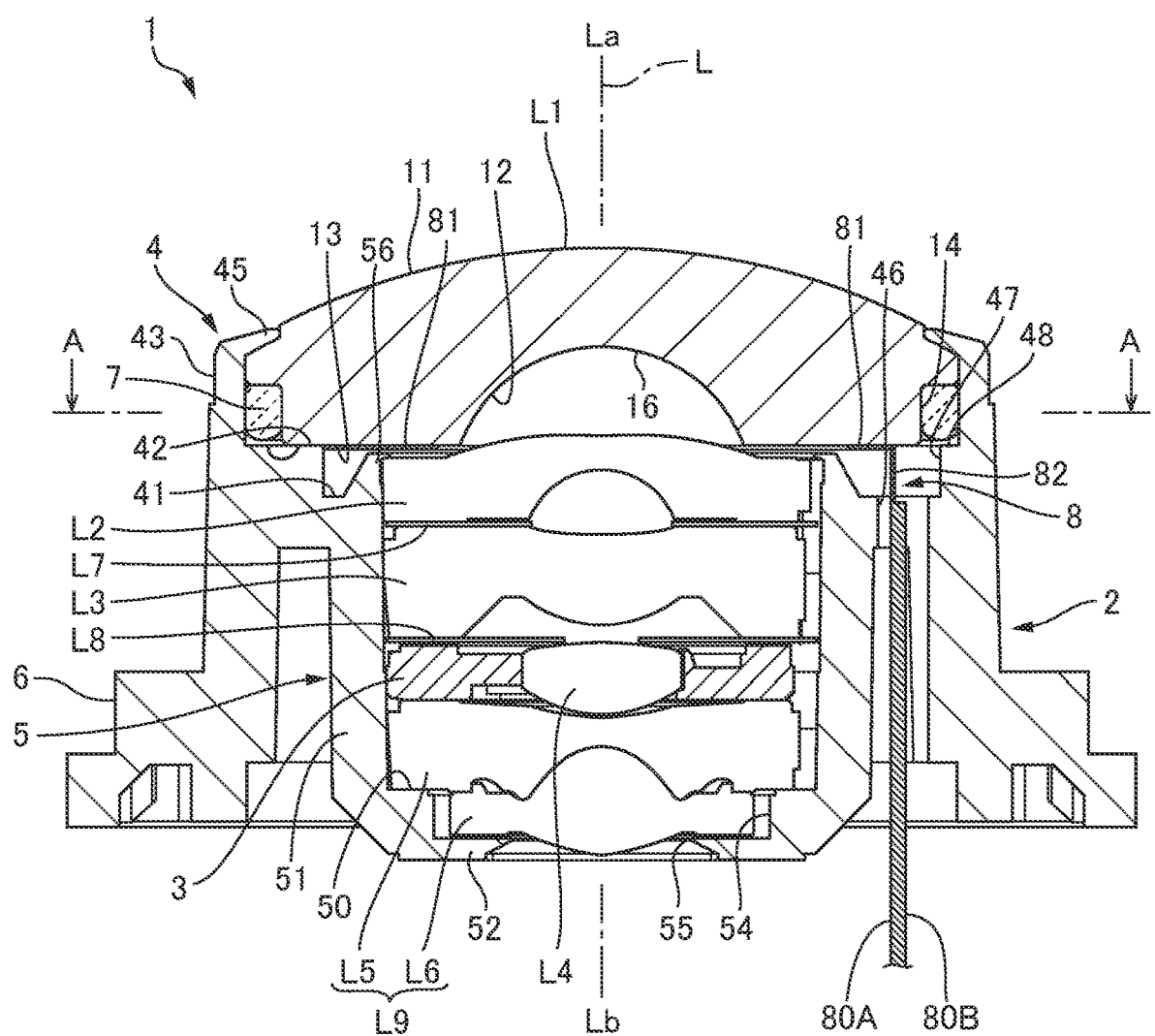
FIG. 1 is a cross-sectional view of a lens unit according to an embodiment of the present invention.

Referring to the drawings, an embodiment of a lens unit to which at least an embodiment of the present invention is applied will be described below.

Entire Configuration

FIG. 1 is a cross-sectional view of the lens unit 1 according to the embodiment of the present invention. In FIG. 1, reference character L denotes an optical axis of the lens unit 1. Reference character La denotes one side in an optical axis L direction and is an object side (subject side) of the lens unit 1. Reference character Lb denotes the other side in the optical axis L direction and is an image side of the lens unit 1. The lens unit 1 includes a plurality of lenses aligned in a row along the optical axis L and a lens holder 2 that holds the plurality of lenses. The plurality of lenses include a first lens L1, a second lens L2, a third lens L3, a fourth lens L4, a fifth lens L5, and a sixth lens L6. A light-shielding plate L7 is disposed between the second lens L2 and the third lens L3, and a diaphragm L8 is disposed between the third lens L3 and the fourth lens L4.

Among the plurality of lenses, the first lens L1 located the closest to the object side La, and the fourth lens L4 are glass lenses. The fourth lens L4 is disposed inside the lens holder 2 in a state fixed to a frame-shaped holder 3. The second lens L2, the third lens L3, the fifth lens L5, and the sixth lens L6 are plastic lenses. The sixth lens L6 and the fifth lens L5 located the closest to the image side Lb constitute a cemented lens L9. The number and configuration of the lenses held in the lens holder 2 are not limited to the above number and configuration.

The lens holder 2 is made of resin. The lens holder 2 includes a first housing portion 4 that holds the first lens L1, a second housing portion 5 that is disposed on the image side Lb of the first housing portion 4, and a lens case 6 that surrounds the outer peripheral side of the second housing portion 5. The lens case 6 extends from an outer peripheral end portion of the first housing portion 4 to the image side Lb. The second lens L2, the third lens L3, the fourth lens L4, and the cemented lenses L9 (the fifth lens L5 and the sixth lens L6) are held in the second housing portion 5.

Figure 2:
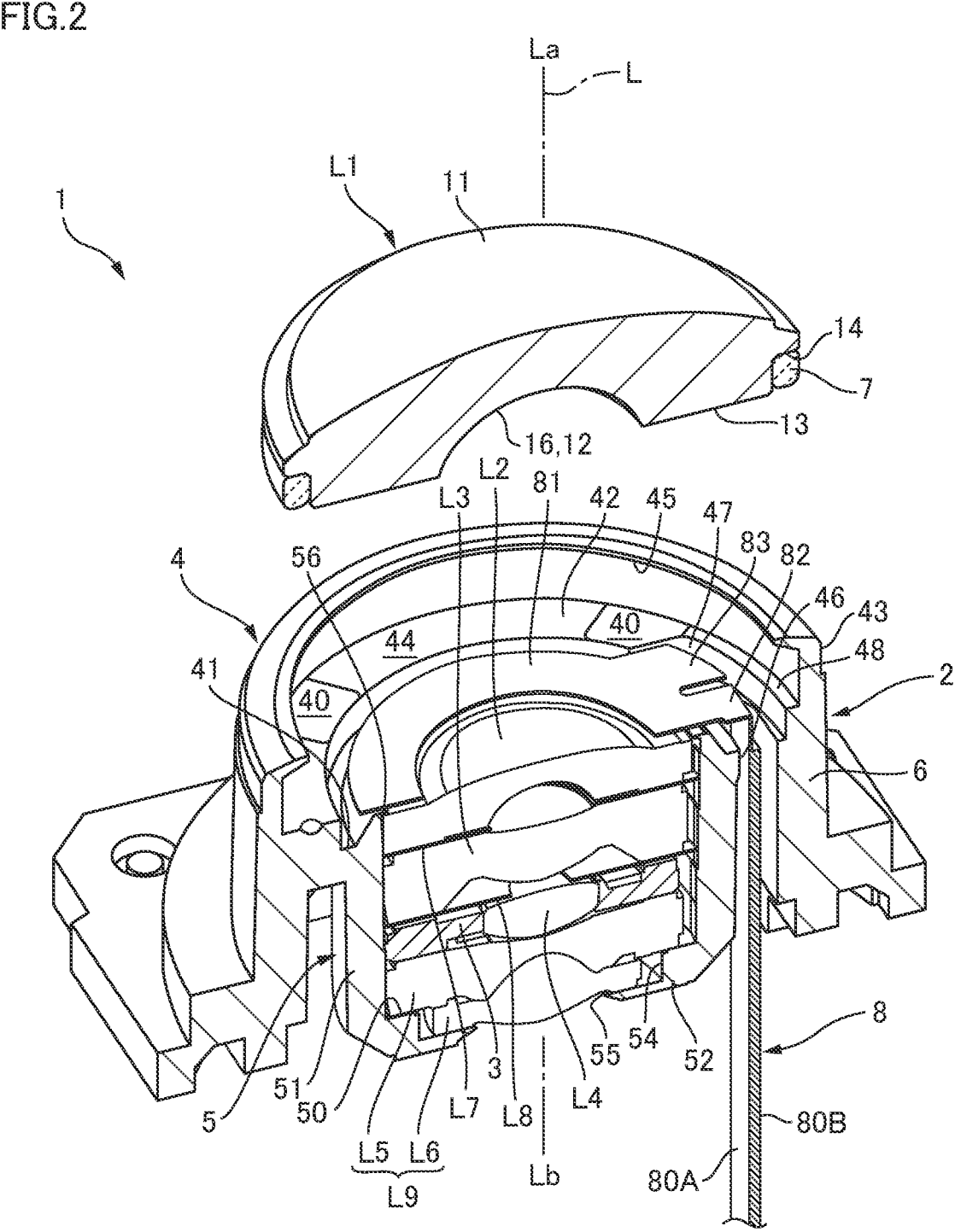
FIG. 2 is an exploded sectional perspective view of the lens unit of FIG. 1.
Figure 3:
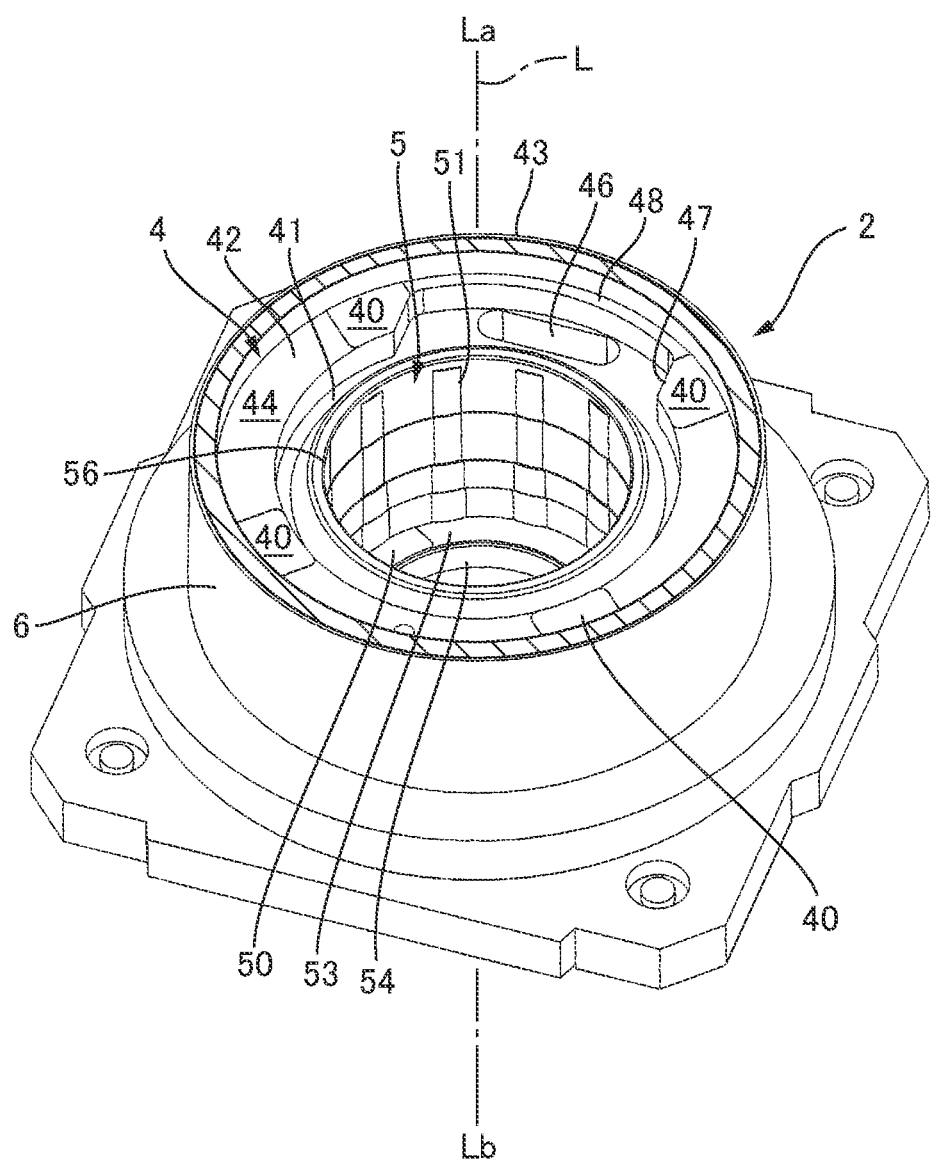
FIG. 3 is a perspective view of a lens holder.
Figure 4A:
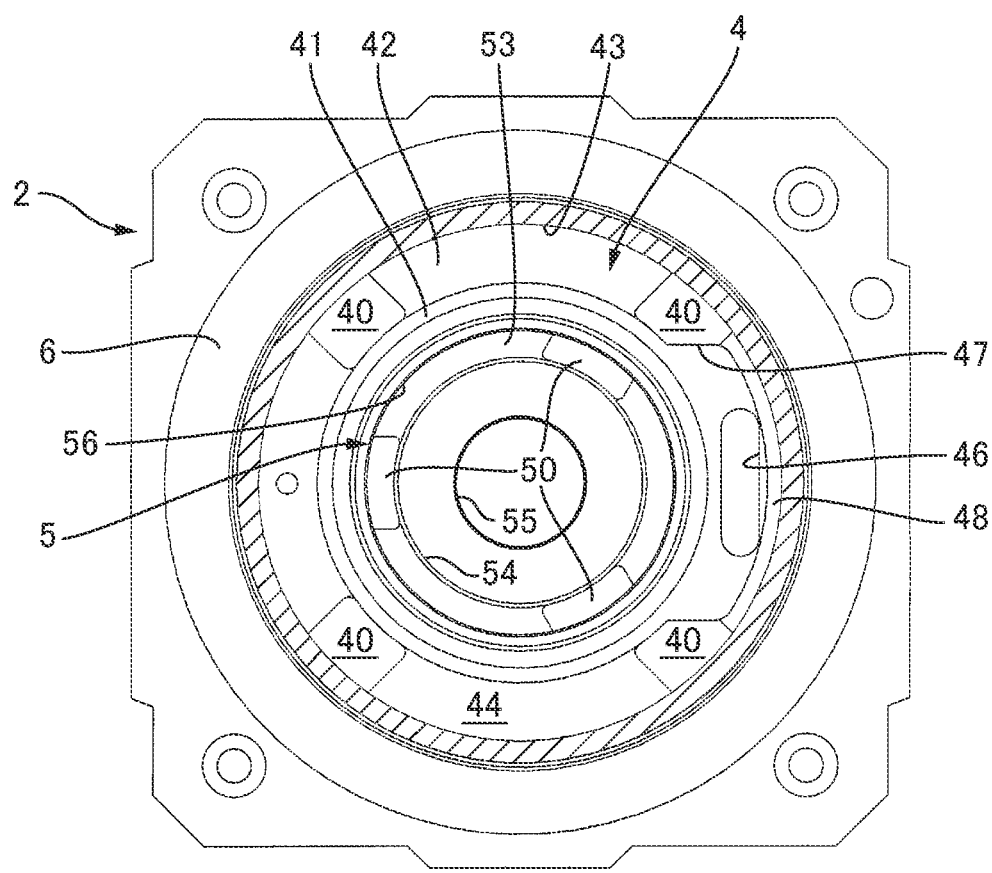
FIG. 4A is a plan view of the lens holder and FIG. 4B is a plan view of the lens unit from which a first lens and an O-ring are removed.
Figure 4B:
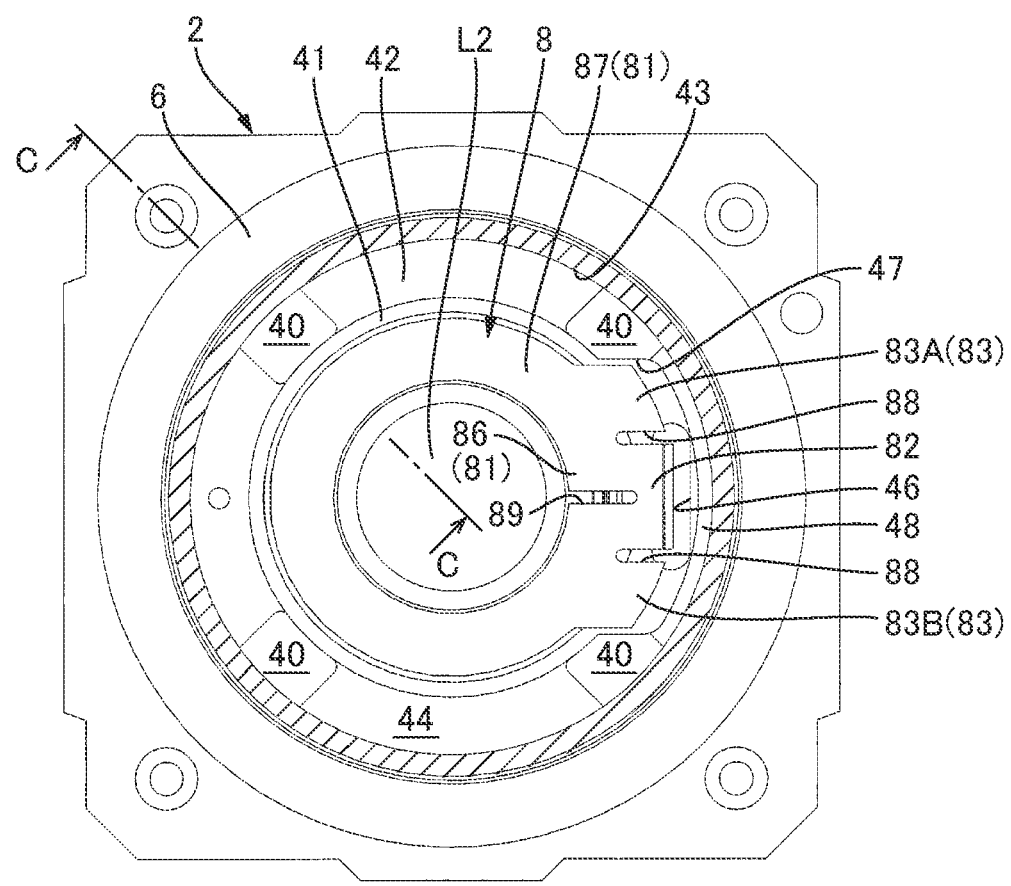

FIG. 2 is an exploded sectional perspective view of the lens unit 1 of FIG. 1. FIG. 3 is a perspective view of the lens holder 2. FIG. 4A is a plan view of the lens holder 2 and FIG. 4B is a plan view of the lens unit 1 from which the first lens L1 and an O-ring 7 are removed. FIGS. 3 and 4 are views in which a portion (caulking portion 45) above an A-A position in FIG. 1 are not shown. As shown in FIGS. 1 and 2, the first lens L1 is disposed in the lens holder 2 with reference to an inner peripheral surface of the first housing portion 4. Moreover, the second lens L2, the third lens L3, the fourth lens L4, and the cemented lenses L9 (the fifth lens L5 and the sixth lens L6) are disposed with reference to an inner circumferential surface of the second housing portion 5.

The first lens L1 is positioned in the optical axis L direction with reference to a lens seating surface 40 formed at the bottom part of the first housing portion 4. As shown in FIGS. 1 and 3, the bottom part of the first housing portion 4 includes an annular connection portion 41 that connects to the outer peripheral surface of the second housing portion 5, an annular regulation portion 42 that projects to the object side La on the outer peripheral side of the annular connection portion 41, and a peripheral wall portion 43 that rises from the outer peripheral edge of the regulation portion 42 to the object side La.

As shown in FIGS. 3 and 4, the regulation portion 42 includes protruding portions at a plurality of positions, slightly protruding from an annular end surface 44 facing the object side La, and the tip end surface of each protruding portion is the lens seating surface 40. In the present embodiment, the lens seating surfaces 40 are provided at four locations at approximately equal angular intervals around the optical axis L. The outer peripheral portion of the first lens L1 is in contact with the lens seating surface 40, and the first lens L1 is caulked and fixed by the caulking portion 45 provided at the tip end of the peripheral wall portion 43. The gap between the first lens L1 and the first housing portion 4 is sealed by the O-ring 7.

As shown in FIGS. 1 and 2, the second housing portion 5 includes a cylindrical portion 51 that connects to the annular connection portion 41 of the first housing portion 4 and a bottom portion 52 provided at an end portion of the image side Lb of the cylindrical portion 51 extending in the optical axis L direction. The second lens L2, the third lens L3, the fourth lens L4, and the cemented lens L9 (the fifth lens L5 and the sixth lens L6) are positioned in the optical axis L direction with reference to the lens seating surface 50 (see FIGS. 3 and 4A) formed on the bottom portion 52 of the second housing portion 5.

The bottom portion 52 of the second housing portion 5 includes protruding portions at a plurality of positions, slightly protruding from an annular bottom surface 53 facing the object side La, and the tip end surface of each protruding portion is the lens seating surface 50. As shown in FIG. 4A, in the present embodiment, the lens seating surfaces 50 are provided at three locations at approximately equal angular intervals around the optical axis L. Further, the second housing portion 5 includes a recess portion 54 recessed by a predetermined depth in the image side Lb on the inner peripheral side of the annular bottom surface 53 and a circular opening 55 provided at the center of the recess portion 54.

The cemented lens L9 is positioned in the optical axis L direction by the outer peripheral portion of the fifth lens L5 brought into contact with the lens seating surface 50. The sixth lens L6 disposed the closest to the image side Lb is accommodated inside the recess portion 54 but is not in contact with the inner surface of the recess portion 54 and is positioned in the optical axis L direction via the fifth lens L5.

The fourth lens L4 located on the object side La of the cemented lens L9 is held by the holder 3, and the holder 3 is brought into contact with the outer peripheral portion of the fifth lens L5 in the optical axis L direction. The outer peripheral portion of the third lens L3 located on the object side La of the fourth lens L4 is in contact with the outer peripheral portion of the holder 3 in the optical axis L direction via the diaphragm L8. Further, the outer peripheral portion of the second lens L2 located on the object side La of the third lens L3 is in contact with the outer peripheral portion of the third lens L3 in the optical axis L direction via the light-shielding plate L7. Therefore, the second lens L2, the third lens L3, and the fourth lens L4 are all positioned in the optical axis L direction with reference to the lens seating surface 50. The second lens L2 is caulked and fixed by a caulking portion 56 provided on an end portion on the object side La of the cylindrical portion 51.

Transparent Conductive Film

The lens unit 1 includes a transparent conductive film 16 disposed on the surface of the first lens L1. The transparent conductive film 16 is a resistive element that generates heat when energized, and is a heater that directly heats the first lens L1. As shown in FIGS. 1 and 2, the first lens L1 includes an object-side lens surface 11 convex to the object side La, an image-side lens surface 12 concave to the object side La, an image-side flange surface 13 surrounding the outer peripheral side of the image-side lens surface 12, and an annular stepped portion 14 recessed to the object side La on the outer peripheral side of the image-side flange surface 13. The image-side flange surface 13 is an annular flat surface perpendicular to the optical axis L. The O-ring 7 is disposed in the annular stepped portion 14.

Figure 5A:
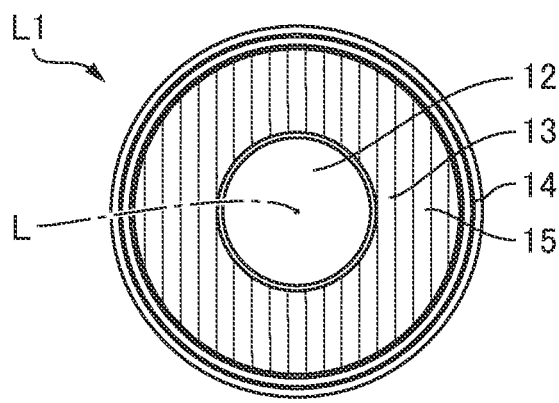
FIGS. 5A, 5B, 5C, and 5D are explanatory views of a heater film, an extraction electrode, and a blackened film disposed on the first lens.
Figure 5B:
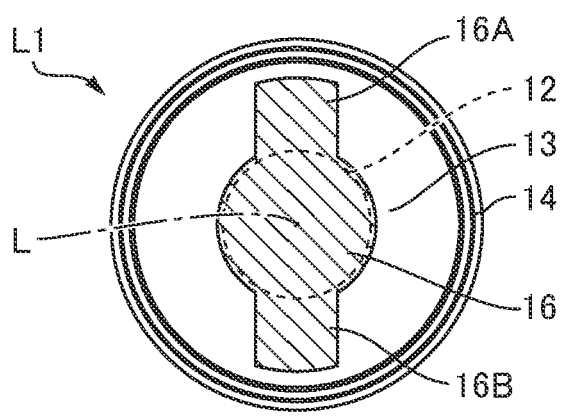
Figure 5C:
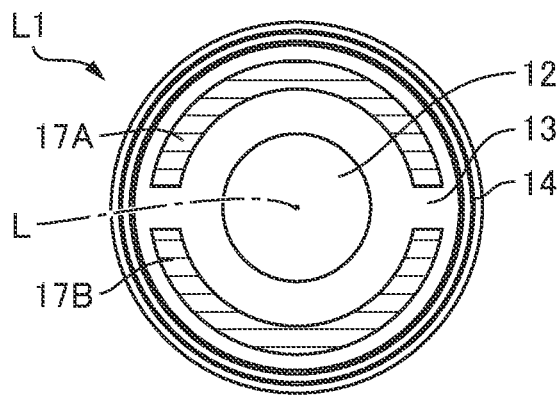
Figure 5D:
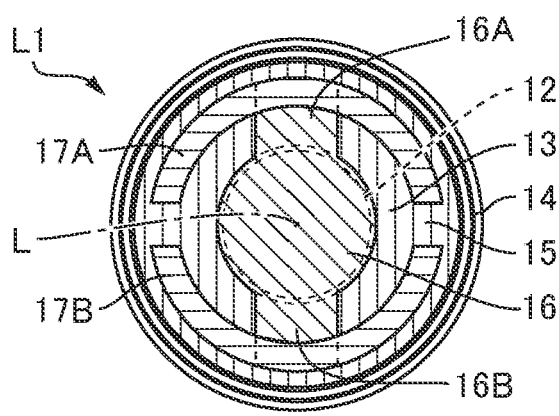

FIGS. 5A, 5B, 5C, and 5D are explanatory views of the transparent conductive film 16, extraction electrodes 17A and 17B, and a blackened film 15 disposed on the first lens L1. FIGS. 5A to 5D are plan views of the first lens L1 viewed from the image side Lb. FIG. 5A shows a planar shape of the blackened film 15, FIG. 5B shows the planar shape of the transparent conductive film 16, and FIG. 5C shows the planar shapes of the extraction electrodes 17A and 17B. FIG. 5D shows a state in which the transparent conductive film 16, the extraction electrodes 17A, 17B, and the blackened film 15 are stacked on the image-side lens surface 12 and the image-side flange surface 13.

The image-side flange surface 13 is a light diffusing surface and has fine irregularities (shibo) formed on the entire surface. In the present embodiment, the blackened film 15 is formed on the image-side flange surface 13. The blackened film 15 is formed, for example, by applying a black paint. The first lens L1 diffuses light by means of the fine irregularities (shibo) and absorbs light by means of black paint and thus, lowering of the optical performance caused by ghosting can be suppressed. As shown in FIG. 5A, the blackened film 15 is formed on substantially the entire image-side flange surface 13.

The transparent conductive film 16 is disposed on the image-side lens surface 12. In the present embodiment, the transparent conductive film 16 is an ITO film. A process of forming the transparent conductive film 16 on the-image side lens surface 12 is performed after the blackened film 15 is formed on the image-side flange surface 13. In the lens unit 1, the image-side lens surface 12 is uniformly heated by energizing the transparent conductive film 16. Power is fed to the transparent conductive film 16 via the extraction electrodes 17A and 17B disposed on the image-side flange surface 13.

As shown in FIG. 5B, the transparent conductive film 16 includes two arm portions 16A and 16B disposed on the image-side flange surface 13. The arm portions 16A and 16B extend from the outer peripheral edge of the image-side lens surface 12 in two directions opposite to each other in the radial direction. The extraction electrodes 17A and 17B are disposed symmetrically to the optical axis L at the center. The extraction electrode 17A extends in an arc state in the circumferential direction around the tip end of the arm portion 16A. The arm portions 16A and 16B and the extraction electrodes 17A and 17B are stacked on top of the blackened film 15.

Flexible Printed Circuit Board

As shown in FIGS. 1 and 2, the lens unit 1 includes a flexible printed circuit board 8. The flexible printed circuit board 8 extends outward in the radial direction from between the first lens L1 and the second lens L2, is bent at an approximately right angle, is passed through a through hole 46 formed in the first housing portion 4 of the lens holder 2, and is pulled out to the image-side Lb of the lens holder 2.

On the flexible printed circuit board 8, power feed wiring 85 and electrodes 84 for feeding power to the transparent conductive film 16 are disposed. Further, a heater 9 is disposed on the flexible printed circuit board 8. That is, in the present embodiment, a heat generating unit (heater) is provided at two locations, that is, on the first lens L1 and the flexible printed circuit board 8, respectively.

Figure 6:
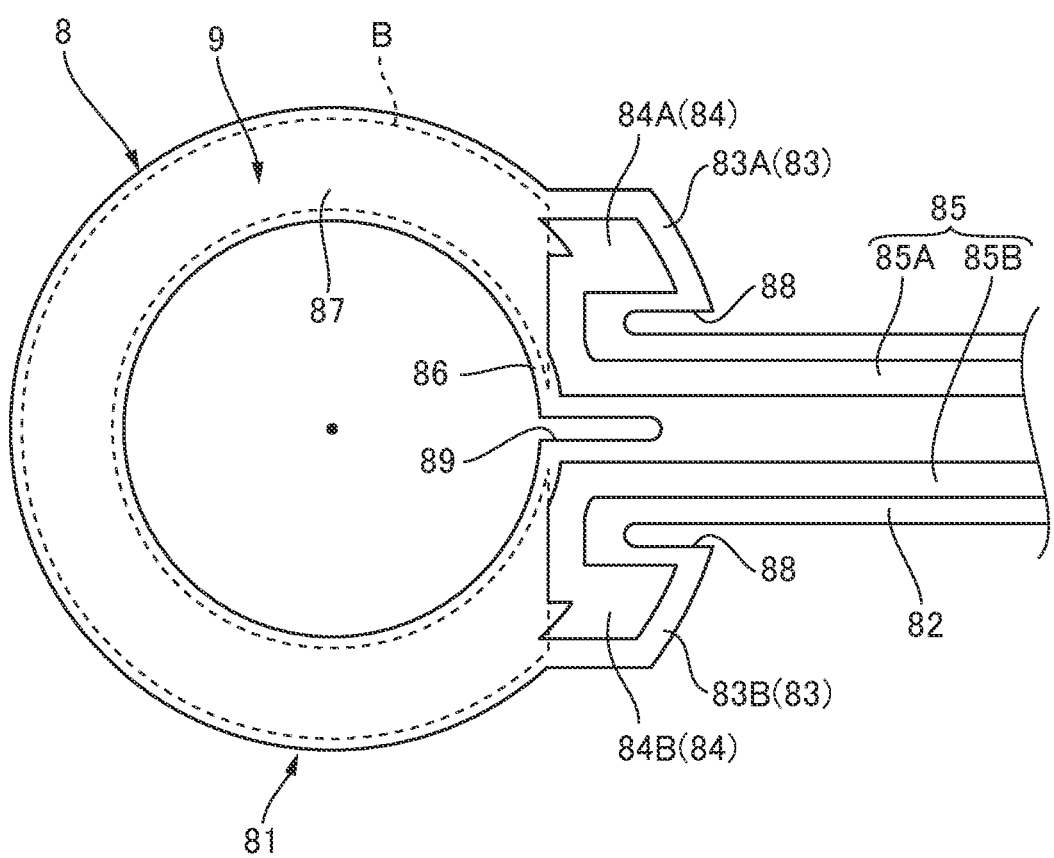
FIG. 6 is a plan view of a flexible printed circuit board.

FIG. 6 is a plan view of the flexible printed circuit board 8. The flexible printed circuit board 8 includes an annular flat surface portion 81 along the image-side flange surface 13, an extension portion 82 extending linearly from the flat surface portion 81 outward in the radial direction, and protruding portions 83 projecting outward in the radial direction from the flat surface portion 81 on both sides in the circumferential direction of the extension portion 82. The heater 9 is disposed on the flat surface portion 81. The region where the heater 9 is located is, for example, a region B enclosed by a broken line in FIG. 6. In the region B, a pattern of a conductive material (not shown) that generates heat when energized is formed.

On the protruding portion 83 of the flexible printed circuit board 8, the electrodes 84 electrically connected to the extraction electrodes 17A and 17B provided on the first lens L1 are disposed. Moreover, the power feed wiring 85 connected to the electrodes 84 and the heater 9 is disposed on the extended portion 82. In more detail, the protruding portion 83 includes a first protruding portion 83A disposed on one side in the circumferential direction of the extension portion 82 and a second protruding portion 83B disposed on the other side in the circumferential direction of the extension portion 82. The electrode 84 includes a first electrode 84A disposed on the first protruding portion 83A and a second electrode 84B disposed on the second protruding portion 83B. The power feed wiring 85 includes a first power feed wiring 85A connected to the first electrode 84A and a second power feed wiring 85B connected to the second electrode 84B. One of the first electrode 84A and the second electrode 84B is a positive electrode, and the other of the first electrode 84A and the second electrode 84B is a negative electrode.

The flat surface portion 81 of the flexible printed circuit board 8 includes a connecting portion 86 disposed on an inner side in the radial direction of the extension portion 82 and an arc portion 87 extending in the circumferential direction on both sides in the circumferential direction of the connecting portion 86. The arc portion 87 is connected to the extension portion 82 via the connecting portion 86. The protruding portion 83 protrudes outward in the radial direction from the arc portion 87 on both sides in the circumferential direction of the connecting portion 86.

The first power feed wiring 85A and the second power feed wiring 85B extend substantially in parallel in an electrically insulated state in the extension portion 82, and extend to opposite sides in the circumferential direction in the connecting portion 86. The first power feed wiring 85A extending to one side in the circumferential direction extends outward in the radial direction toward the first protruding portion 83A and is connected to the first electrode 84A. Further, the second power feed wiring 85B extending to the other side in the circumferential direction extends outward in the radial direction toward the second protruding portion 83B and is connected to the second electrode 84B. In FIG. 6, only the disposed region of the electrodes 84 and the power feed wiring 85 is illustrated, and the detailed configuration of the electrodes 84 and the power feed wiring 85 is not shown. The electrode 84 only needs to be disposed on the protruding portion 83, and its disposed region is not limited to the region shown in FIG. 6. Further, the disposed region of the power feed wiring 85 is not limited to the region shown in FIG. 6, either.

The flexible printed circuit board 8 includes a flexible substrate 80A made of a resin film such as polyimide, and patterns such as wiring and electrodes formed on the flexible substrate 80A by a conductive material such as Cu. In the present embodiment, the electrode 84 for energizing the transparent conductive film 16, the power feed wiring 85 for feeding power to the transparent conductive film 16 and the heater 9, and a pattern of the conductive material that functions as the heater 9 are formed on the flexible substrate 80A. An overcoat is applied to the surface of the flexible substrate 80A so as to cover the pattern of the conductive material. Further, some of the patterns of the conductive material are exposed without being overcoated. For example, the electrodes 84 to be electrically connected to the transparent conductive film 16 are not covered by the overcoat.

The flexible printed circuit board 8 includes a first notch portion 88 in which a portion adjacent to the protruding portion 83 in the circumferential direction is notched linearly toward the inner side in the radial direction. In more detail, the first notch portion 88 is provided at two locations: between the first protruding portion 83A and the extension portion 82, and between the second protruding portion 83B and the extension portion 82. By providing the first notch portion 88, warping of the first protruding portion 83A and the second protruding portion 83B is suppressed. In addition, the electrode 84 and the power feed wiring 85 are hardly short-circuited.

The flexible printed circuit board 8 also includes a second notch portion 89 in which an inner peripheral edge of the connecting portion 86 is linearly notched toward the outer side in the radial direction. The second notch portion 89 is located substantially at a center in the circumferential direction of the extension portion 82 and is disposed between the first power feed wiring 85A and the second power feed wiring 85B. By providing the second notch portion 89, warping of the connecting portion 86 is suppressed, and the first power feed wiring 85A and the second power feed wiring 85B are hardly short-circuited.

In the present embodiment, the first notch portion 88 and the second notch portion 89 are used as adhesive application grooves. When the lens unit 1 is assembled, the flexible printed circuit board 8 is fixed to the image-side flange surface 13 by an adhesive disposed in the first notch portion 88 and the second notch portion 89.

Figure 7:
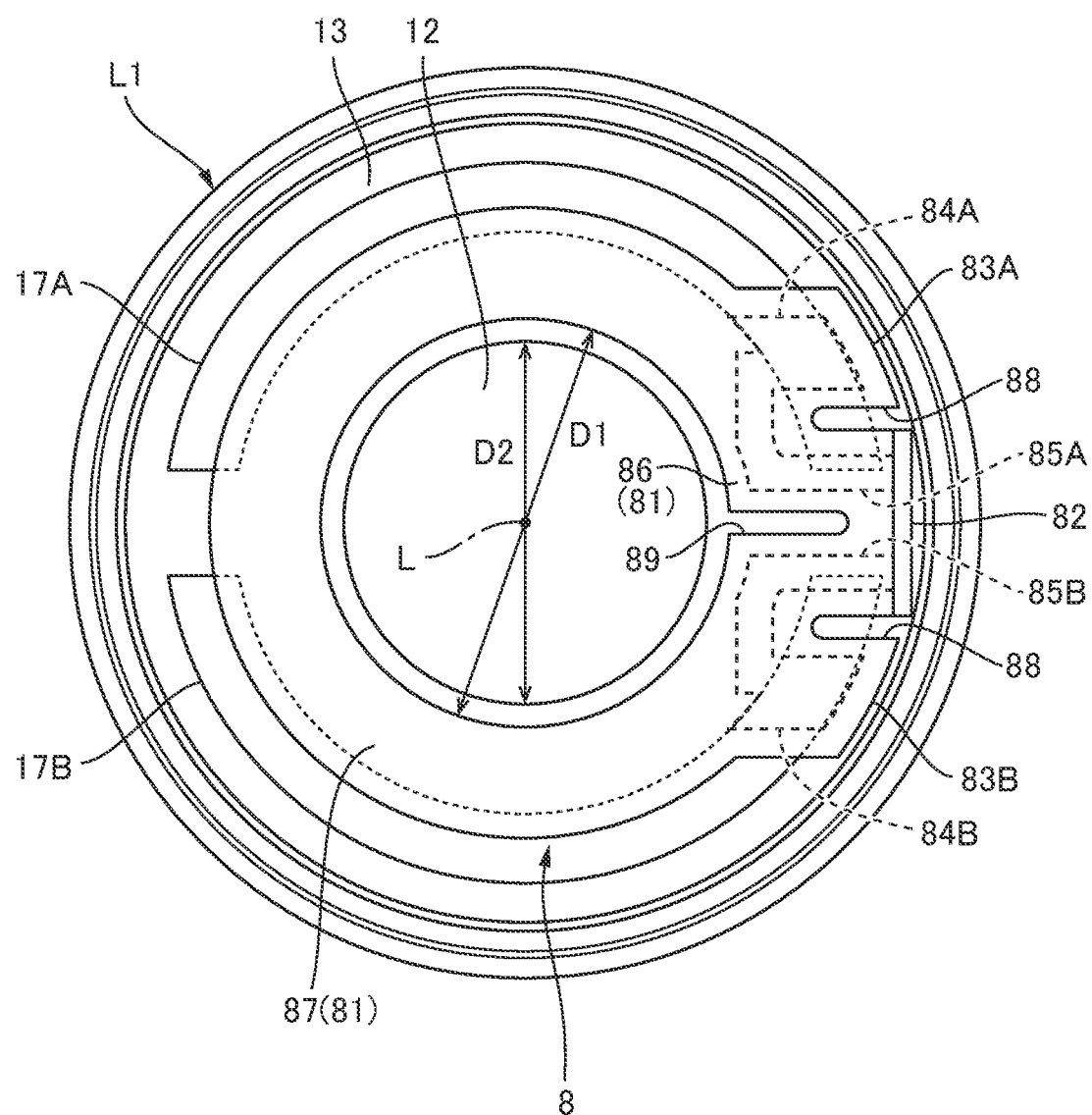
FIG. 7 is an explanatory view illustrating arrangement of a flexible printed circuit board and the extraction electrode on the image-side flange surface.

FIG. 7 is an explanatory view showing the arrangement of the flexible printed circuit board 8 and the extraction electrodes 17A, 17B on the image-side flange surface 13. As shown in FIG. 7, when the flat surface portion 81 of the flexible printed circuit board 8 is to be fixed to the image-side flange surface 13, the flat surface portion 81 is positioned so that the center of the image-side flange surface 13 and the center of the flat surface portion 81 coincide. The shape of the flat surface portion 81 is set to such a shape that is unlikely to affect the optical performance of the lens unit 1. In the present embodiment, an inner diameter D1 of the flat surface portion 81 is larger than an inner diameter D2 of the image-side flange surface 13 by a predetermined dimension (e.g., 0.4 mm). Therefore, there is little risk of the inner peripheral edge of the flat surface portion 81 to protrude to the inner side of the image-side lens surface 12 and to lower the optical performance.

When the flat surface portion 81 is to be fixed to the image-side flange surface 13, the flat surface portion 81 is positioned in the circumferential direction so as to dispose the second notch portion 89 provided at the center in the width direction of the extension portion 82 at the center of a circumferential gap between the two extraction electrodes 17A and 17B. As a result, the first electrode 84A overlaps with the extraction electrode 17A, and the second electrode 84B overlaps with the extraction electrode 17B. Therefore, the power feed wiring 85 is electrically connected to the transparent conductive film 16 through the arm portions 16A and 16B and the extraction electrodes 17A and 17B.

In the present embodiment, since the extraction electrodes 17A and 17B extend in the circumferential direction, the power feeding position to the extraction electrode 17A and the power feeding position to the extraction electrode 17B can be brought closer. Therefore, the first electrode 84A and the second electrode 84B for connection with the extraction electrodes 17A and 17B can be concentratedly disposed close to the extension portion 82. As a result, the power feed wiring 85 to be provided between the extension portion 82 and the first and second electrodes 84A and 84B can be made short and simple in shape.

Positioning of the First Lens in the Optical Axis L Direction

Figure 8:
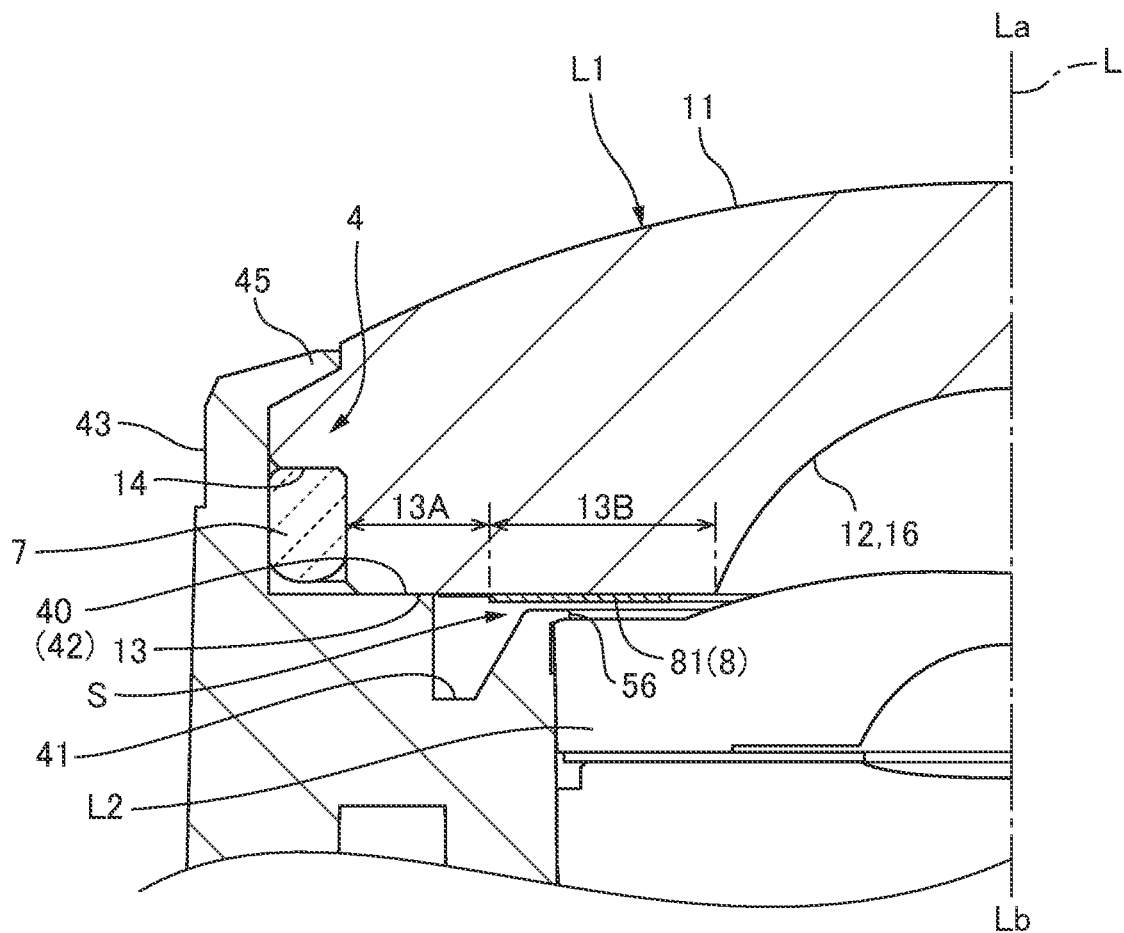
FIG. 8 is a partially enlarged cross-sectional view of the lens unit.

FIG. 8 is a partially enlarged cross-sectional view of the lens unit 1, which is cut at a C-C position in FIG. 4B. As shown in FIG. 8, the lens holder 2 includes the regulation portion 42 protruding from the bottom surface of the first housing portion 4 to the object side La, and the image-side flange surface 13 of the first lens L1 includes an outer peripheral region 13A which is brought into contact with the lens seating surface 40 provided at the tip end of the regulation portion 42. Further, the image-side flange surface 13 includes an inner peripheral region 13B located on the inner peripheral side of the outer peripheral region 13A, and the flat surface portion 81 of the flexible printed circuit board 8 is disposed on the inner peripheral region 13B.

When the first lens L1 is attached to the first housing portion 4, as shown in FIG. 4B and FIG. 8, the flat surface portion 81 disposed in the inner peripheral region 13B of the image-side flange surface 13 is disposed on the inner peripheral side of the regulation portion 42. Therefore, the flat surface portion 81 does not interfere with the regulation portion 42, and the flexible printed circuit board 8 is not sandwiched between the first lens L1 and the lens holder 2. In the present embodiment, the position of the first lens L1 in the optical axis L direction is defined by direct contact between the outer peripheral region 13A of the image-side flange surface 13 and the lens seating surface 40.

As shown in FIG. 8, the flat surface portion 81 of the flexible printed circuit board 8 extends farther to the outer side in the radial direction than the caulking portion 56 that fixes the outer peripheral edge of the second lens L2. In the present embodiment, a gap S in the optical axis L direction between the caulking portion 56 and the inner peripheral region 13B of the image-side flange surface 13 is larger than a thickness of the flexible printed circuit board 8. Therefore, the flat surface portion 81 does not interfere with the caulking portion 56, and the flexible printed circuit board 8 is not sandwiched between the first lens L1 and the caulking portion 56.

Counterbore Portion

As shown in FIGS. 2, 3, and 4, the first housing portion 4 includes a counterbore portion 47 recessed to the outer side in the radial direction from the inner peripheral edge of the regulation portion 42. As shown in FIG. 4B, the extension portion 82 and the protruding portion 83 of the flexible printed circuit board 8 are disposed in the counterbore portion 47. Further, as shown in FIG. 2, the extension portion 82 is bent to the image side Lb on the way of extending outward in the radial direction and is inserted into the slit-shaped through hole 46 opened in the bottom surface of the counterbore portion 47. Therefore, the extension portion 82 and the protruding portion 83 do not interfere with the regulation portion 42. The extension portion 82 may include a reinforcing plate 80B that is fixed to the flexible substrate 80A. If the reinforcing plate 80B is provided, the reinforcing plate 80B is disposed in the through hole 46.

As shown in FIGS. 1 and 2, the through hole 46 penetrates the bottom part of the first housing portion 4 in the optical axis L direction and communicates with a gap between the cylindrical portion 51 of the second housing portion 5 and the lens case 6. The inner peripheral surface of the lens case 6 is recessed in a shape that follows the edge on the outer side in the radial direction of the through hole 46. The extension portion 82 inserted in the through hole 46 is withdrawn to the image side Lb of the lens holder 2 through the gap between the inner peripheral surface of the lens case 6 and the outer peripheral surface of the cylindrical portion 51.

In the present embodiment, the extension portion 82 is not fixed to the through hole 46, but an adhesive can be disposed in the through hole 46 so that the adhesive can fix the extension portion 82 to the through hole 46. In this case, by forming irregularities on the inner peripheral surface of the through hole 46, an adhesive area can be increased, and the fixing strength of the extension portion 82 can be enhanced.

The regulation portion 42 includes an outer edge portion 48 extending in the circumferential direction on the outer side in the radial direction of the counterbore portion 47. The outer edge portion 48 is connected to the lens seating surface 40 provided on both sides in the circumferential direction of the counterbore portion 47. Therefore, in the present embodiment, the regulation portion 42 is annular as a whole and faces the outer peripheral edge of the first lens L1 over the entire circumference. Therefore, since the O-ring 7 disposed at the outer peripheral edge of the first lens L1 is supported by the regulation portion 42 over the entire circumference, falling of the O-ring 7 into the inner side of the counterbore portion 47 which causes lowering of the sealing performance can be avoided.

Main Effects of the Present Embodiment

As described above, the lens unit 1 of the present embodiment has the first lens L1 the closest to the object side La, the second lens L2 disposed on the image side Lb with respect to the first lens L1, the lens holder 2 including the first housing portion 4 that accommodates the first lens L1 and the second housing portion 5 that accommodates the second lens L2, and the flexible printed circuit board 8 including the heater 9. The first lens L1 includes the object-side lens surface 11, the image-side lens surface 12, and the image-side flange surface 13 surrounding the image-side lens surface 12. The first housing portion 4 includes the regulation portion 42 that regulates the position of the first lens L1 in the optical axis L direction. The image-side flange surface 13 includes the inner peripheral region 13B in which the flexible printed circuit board 8 is disposed and the outer peripheral region 13A with which the regulation portion 42 is brought into contact.

In the lens unit 1 of the present embodiment, since the flexible printed circuit board 8 including the heater 9 is disposed on the image-side flange surface 13 of the first lens L1, the temperature around the first lens L1 can be raised. Therefore, condensation inside the lens unit 1 which causes lowering of the optical performance can be suppressed. Further, the outer peripheral region 13A of the first lens L1 is in direct contact with the regulation portion 42 provided on the lens holder 2, and the flexible printed circuit board 8 is not sandwiched between the first lens L1 and the lens holder 2. Therefore, influence of variations in the thickness tolerance of the flexible printed circuit board 8 on the positional accuracy of the first lens L1 can be avoided. Thus, the lowering of the positional accuracy of the first lens L1 can be avoided, and variations in the optical performance can be suppressed.

The flexible printed circuit board 8 of the present embodiment has the flat surface portion 81 along the image-side flange surface 13 and the extension portion 82 extending outward in the radial direction, and the flat surface portion 81 includes the connecting portion 86 connected to the extension portion 82. The first housing portion 4 includes the counterbore portion 47 recessed to the outer side in the radial direction from the inner peripheral edge of the regulation portion 42, and the connecting portion 86 is disposed in the counterbore portion 47. Therefore, the connecting portion 86 connecting the extension portion 82 for withdrawing the flexible printed circuit board 8 to the outside and the flat surface portion 81 on which the heater 9 is to be disposed can be disposed so as not to interfere with the regulation portion 42. Thus, lowering of the positional accuracy of the first lens L1 caused by the placement of the flexible printed circuit board 8 on the image-side flange surface 13 can be avoided.

In the present embodiment, the transparent conductive film 16 (conductive film) is disposed on the image-side lens surface 12 of the first lens L1. The flexible printed circuit board 8 includes the protruding portion 83 that protrudes outward in the radial direction from the flat surface portion 81. The protruding portion 83 is disposed in the counterbore portion 47. Further, the electrode 84 electrically connected to the transparent conductive film 16 is disposed on the protruding portion 83. Therefore, in the present embodiment, since the lens surface of the first lens L1 can be directly heated by generating heat in the transparent conductive film 16, the generation of condensation can be suppressed. In addition, since power can be fed to the transparent conductive film 16 by using the flexible printed circuit board 8, complexity of wiring inside the lens unit 1 can be avoided. Further, since the electrodes 84 for connection to the transparent conductive film 16 are disposed on the protruding portion 83 accommodated in the counterbore portion 47, sandwiching of the electrodes 84 between the lens holder 2 and the first lens L1 can be avoided. Therefore, there is little risk of a nonconformity such as a short-circuit caused by a crush of the pattern of conductors constituting the electrode 84.

In the present embodiment, the image-side flange surface 13 on which the flexible printed circuit board 8 is disposed has the blackened film 15 formed. Therefore, since the blackened film 15 overlaps with the flexible printed circuit board 8, there is little influence of the placement of the flexible printed circuit board 8 on the optical performance. In addition, since ghosting caused by the light transmitted through the image-side flange surface 13 can be suppressed by the blackened film 15, lowering of the optical performance caused by the ghosting can be suppressed. Further, in the present embodiment, the transparent conductive film 16 includes the arm portions 16A and 16B that are stacked on top of the blackened film 15 and it is connected to the electrodes 84 via the arm portions 16A and 16B. In this way, by forming the transparent conductive film 16 on the blackened film 15, the transparent conductive film 16 can be formed easily. For example, if irregularities (shibo) are formed on the image-side flange surface 13 for diffusing light, the irregularities (shibo) are filled by the blackened film 15 and smoothened. Therefore, the arm portions 16A and 16B of the transparent conductive film 16 can be easily formed on the image-side flange surface 13.

In the present embodiment, the regulation portion 42 includes a plurality of lens seating surfaces 40 in contact with the image-side flange surface 13, and two of the lens seating surfaces 40 are disposed at positions adjacent to the counterbore portion 47 on one side in the circumferential direction and at positions adjacent to the counterbore portion 47 on the other side in the circumferential direction. In this way, by supporting the first lens L1 on both sides of the counterbore portion 47, inclination of the first lens L1 to the side of the counterbore portion 47 can be avoided. Therefore, the lowering of the optical performance of the lens unit 1 can be suppressed.

In the present embodiment, the regulation portion 42 is annular and faces the outer peripheral edge of the first lens L1 over the entire circumference. Therefore, since a sealing material such as the O-ring 7 disposed between the outer peripheral edge of the first lens L1 and the lens holder 2 can be supported over the entire circumference, there is little risk of lowering of sealing performance. In addition, by making the regulation portion 42 annular, the lens seating surface 40 can be uniformly disposed in the circumferential direction. Therefore, inclination of the first lens L1 can be avoided, and the lowering of the optical performance of the lens unit 1 can be suppressed.

In the present embodiment, the regulation portion 42 includes the outer edge portion 48 extending in the circumferential direction on the outer peripheral side of the counterbore portion 47. Therefore, since the O-ring 7 can be supported by the outer edge portion 48, falling of the O-ring 7 into the inner side of the counterbore portion 47 which causes lowering of the sealing performance can be avoided.

Modification (1) In the above embodiment, the transparent conductive film 16 that functions as a heater is provided on the image-side lens surface 12, but the transparent conductive film 16 does not have to be provided. In this case, the extraction electrodes 17A and 17B do not have to be provided on the image-side flange surface 13. Further, the flexible printed circuit board 8 does not have to have the electrode 84 for feeding power to the transparent conductive film 16 provided.

(2) In the above embodiment, the flat surface portion 81 of the flexible printed circuit board is annular, but it may be such a shape that a part in the circumferential direction of the flat surface portion 81 is missing.

Figure 9A:
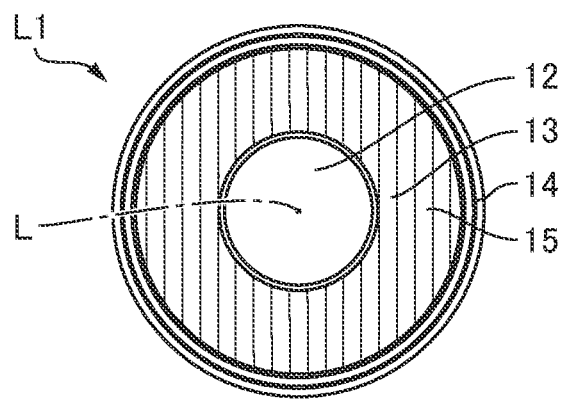
FIGS. 9A, 9B, 9C, and 9D are explanatory views of a metal thin film, a protective film, and a blackened film disposed on the first lens.
Figure 9B:
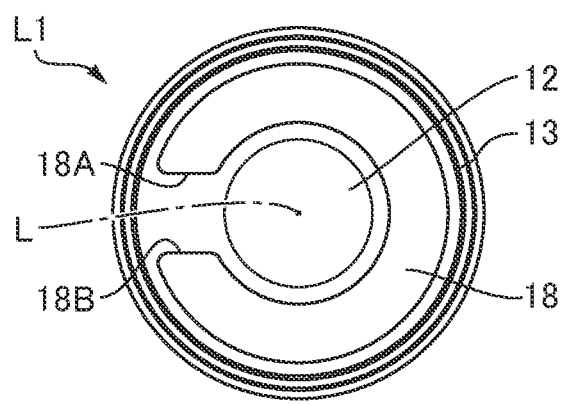
Figure 9C:
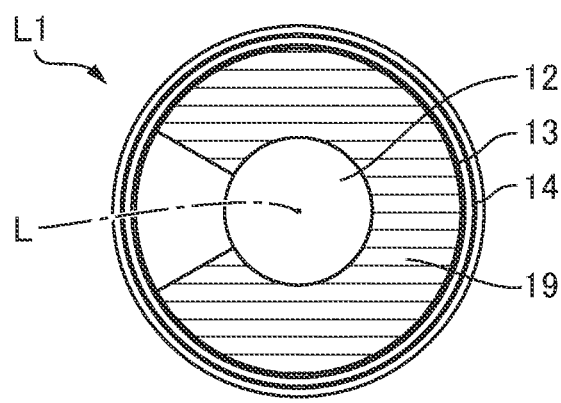
Figure 9D:
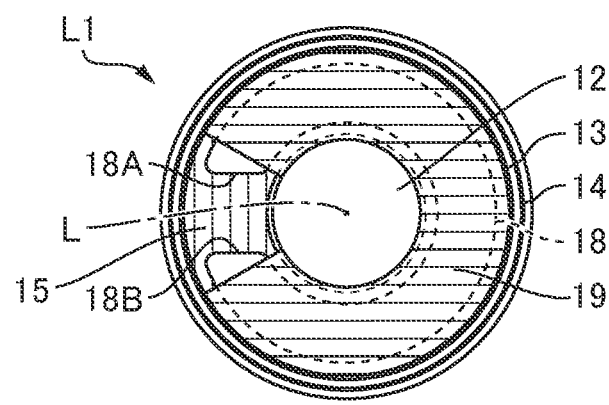

(3) The above embodiment has a configuration in which the transparent conductive film 16 such as an ITO film is disposed on the image side surface (image-side lens surface 12 and image-side flange surface 13) of the first lens L1 as a conductive film that directly heats the first lens L1, but such a configuration in which other conductive films are disposed on the image side surface of the first lens L1 can also be employed. FIGS. 9A, 9B, 9C, and 9D are explanatory views of the metal thin film 18, the protective film 19, and the blackened film 15 disposed on the first lens L1. FIGS. 9A, 9B, 9C, and 9D are plan views of the first lens L1 viewed from the image side Lb. FIG. 9A shows the planar shape of the blackened film 15, FIG. 9B shows the planar shape of the metal thin film 18, and FIG. 9C shows the planar shape of the protective film 19. FIG. 9D shows the state in which the metal thin film 18, the protective film 19, and the blackened film 15 are stacked on the image-side flange surface 13.

The metal thin film 18 is a conductive film and is disposed on the image-side flange surface 13 of the first lens L1. The metal thin film 18 is constituted by, for example, a NiFe film, a Ni film or a Cr film, a laminated film in which the Ni film and the Cr film are laminated, and the like. The metal thin film 18 is stacked on top of the blackened film 15. As shown in FIG. 9B, the metal thin film 18 is disposed on a part in the circumferential direction of the image-side flange surface 13. In the present embodiment, the metal thin film 18 extends in an arc shape on the image-side flange surface 13 and has a C-shaped planar shape. The tip end portion 18A on one side in the circumferential direction of the metal thin film 18 and the tip end portion 18B on the other side in the circumferential direction of the metal thin film 18 face each other with a predetermined gap in the circumferential direction.

The protective film 19 has low moisture permeability and can protect the metal thin film 18 from moisture. For example, a non-conductive film such as a SiO2 film is preferably used for the protective film 19. The protective film 19 is stacked on top of the metal thin film 18. As shown in FIG. 9C, the protective film 19 has a C-shaped planar shape similarly to the metal thin film 18. The protective film 19 extends over the entire range in the radial direction from the inner peripheral edge to the outer peripheral edge of the image-side flange surface 13, but an angular range in which the protective film 19 is provided is smaller than the angular range in which the metal thin film 18 is provided. Therefore, as shown in FIG. 9D, the entire range of the metal thin film 18, except for the tip end portions 18A and 18B, is covered by the protective film 19.

In the lens unit 1, the image-side flange surface 13 is heated by energizing the metal thin film 18. Power is fed to the metal thin film 18 via the tip end portions 18A and 18B exposed from the protective film 19. When the flat surface portion 81 of the flexible printed circuit board 8 is disposed on the protective film 19 disposed on the image-side flange surface 13, the electrodes 84 provided on the protruding portions 83 projecting from the flat surface portion 81 are brought into contact with the tip end portions 18A and 18B of the metal thin film 18. Therefore, the metal thin film 18 is energized via the electrode 84.

As described above, in the modification shown in FIGS. 9, since the image-side flange surface 13 of the first lens can be directly heated by the metal thin film 18, condensation inside the lens unit 1 which lowers the optical performance can be suppressed. In addition, compared with the case where the transparent conductive film 16 is formed on the image-side lens surface 12, the influence of ghosting or the like on the optical performance can be reduced.

Further, in the modification shown in FIGS. 9, similarly to the above embodiment, the flexible printed circuit board 8 overlaps with the blackened film 15, so that the lowering of optical performance caused by the placement of the flexible printed circuit board 8 can be suppressed. In addition, since ghosting caused by the light transmitted through the image-side flange surface 13 can be suppressed by the blackened film 15, lowering of the optical performance caused by the ghosting can be suppressed. In addition, since the protective film 19 can protect the metal thin film 18, environmental resistance can be improved. In particular, in a high-temperature and high-humidity state, there is a concern that the metal thin film 18 is oxidized and cracked, resulting in a change in a resistance value, but the protection of the metal thin film 18 by the protective film 19 can suppress occurrence of cracks. Therefore, the change in resistance value of the metal thin film 18 can be suppressed, and the variation of a heat generation amount can be suppressed. Further, when the flexible printed circuit board 8 is disposed on the first lens, the protective film 19 can be used as a fixing surface to fix the flat surface portion 81.

What is claimed is:

1. A lens unit comprising:
a first lens located the closest to an object side;
a second lens disposed on an image side with respect to the first lens;
a lens holder including a first housing portion that accommodates the first lens and a second housing portion that accommodates the second lens; and
a flexible printed circuit board including a heater,
wherein the first lens includes an object-side lens surface, an image-side lens surface, and an image-side flange surface that surrounds the image-side lens surface,
the first housing portion includes a regulation portion that regulates a position of the first lens in an optical axis direction,
an object side end surface of the regulation portion is a lens seating surface that positions the first lens in the optical axis direction, and
the image-side flange surface includes an inner peripheral region in which the flexible printed circuit board is disposed and an outer peripheral region with which the object side end surface of the regulation portion is brought into contact, from the object side in the optical axis direction.

2. The lens unit according to claim 1, wherein
the flexible printed circuit board includes a flat surface portion along the image-side flange surface and an extension portion extending outward in a radial direction;
the flat surface portion includes a connecting portion connected to the extension portion;
the first housing portion includes a counterbore portion recessed outward in the radial direction from an inner peripheral edge of the regulation portion; and
the connecting portion is disposed in the counterbore portion.

3. The lens unit according to claim 2, wherein
the lens holder includes a through hole opened in an inner surface of the counterbore portion; and
the extension portion is inserted into the through hole.

4. The lens unit according to claim 2, further comprising:
a transparent conductive film disposed on the image-side lens surface, wherein
the flexible printed circuit board includes a protruding portion that protrudes outward in the radial direction from the flat surface portion;
the protruding portion is disposed in the counterbore portion; and
an electrode electrically connected to the transparent conductive film is disposed on the protruding portion.

5. The lens unit according to claim 4, further comprising:
a blackened film formed on the image-side flange surface, wherein
the transparent conductive film includes arm portions stacked on top of the blackened film and is connected to the electrode via the arm portions.

6. The lens unit according to claim 2, further comprising:
a metal thin film disposed on the image-side flange surface, wherein
the metal thin film is disposed on a part of the image-side flange surface in a circumferential direction;
the flexible printed circuit board includes a protruding portion that protrudes outward in the radial direction from the flat surface portion; the protruding portion is disposed on the counterbore portion; and
a tip end portion in a circumferential direction of the metal thin film is connected to an electrode disposed on the protruding portion.

7. The lens unit according to claim 6, further comprising:
a blackened film formed on the image-side flange surface, wherein
the metal thin film is laminated on the blackened film;
a protective film is laminated on the metal thin film;
the metal thin film is covered by the protective film over an entire range except for the tip end portion; the flat surface portion is annular; and
the flat surface portion is disposed on the protective film.

8. The lens unit according to claim 2, wherein
the regulation portion includes a plurality of lens seating surfaces that are brought into contact with the image-side flange surface; and
two of the lens seating surfaces are disposed at positions adjacent to each other on one side in the circumferential direction with respect to the counterbore portion and at positions adjacent to each other on the other side in the circumferential direction with respect to the counterbore portion.

9. The lens unit according to claim 2, wherein
the regulation portion has an outer edge portion extending in the circumferential direction on an outer side in the radial direction of the counterbore portion.

10. The lens unit according to claim 1, wherein
the regulation portion is annular and faces the outer peripheral edge of the first lens over the entire circumference.

11. The lens unit according to claim 3, further comprising:
a transparent conductive film disposed on the image-side lens surface, wherein
the flexible printed circuit board includes a protruding portion that protrudes to an outer side in the radial direction from the flat surface portion;
the protruding portion is disposed in the counterbore portion; and an electrode electrically connected to the transparent conductive film is disposed on the protruding portion.

12. The lens unit according to claim 11, further comprising:
a blackened film formed on the image-side flange surface, wherein
the transparent conductive film includes arm portions stacked on top of the blackened film and is connected to the electrode via the arm portions.

13. The lens unit according to claim 3, further comprising:
a metal thin film disposed on the image-side flange surface, wherein
the metal thin film is disposed on a part of the image-side flange surface in a circumferential direction;
the flexible printed circuit board includes a protruding portion that protrudes outward in the radial direction from the flat surface portion;
the protruding portion is disposed in the counterbore portion; and
a tip end portion in a circumferential direction of the metal thin film is connected to an electrode disposed on the protruding portion.

14. The lens unit according to claim 13, further comprising:
a blackened film formed on the image-side flange surface, wherein
the metal thin film is laminated on the blackened film;
a protective film is laminated on the metal thin film;
the metal thin film is covered by the protective film over an entire range except for the tip end portion;
the flat surface portion is annular; and
the flat surface portion is disposed on the protective film.

15. The lens unit according to claim 3, wherein
the regulation portion includes a plurality of lens seating surfaces that are brought into contact with the image-side flange surface; and
two of the lens seating surfaces are disposed at positions adjacent to each other on one side in the circumferential direction with respect to the counterbore portion and at positions adjacent to each other on the other side in the circumferential direction with respect to the counterbore portion.

16. The lens unit according to claim 15, wherein
the regulation portion includes an outer edge portion that extends in the circumferential direction on the outer side in the radial direction of the counterbore portion.

17. The lens unit according to claim 3, wherein
the regulation portion includes an outer edge portion that extends in the circumferential direction on the outer side in the radial direction of the counterbore portion.

* * * * *